United States Patent [19]

Sherwood et al.

[11] 3,762,247
[45] Oct. 2, 1973

[54] TOOL ADJUSTMENT MECHANISMS FOR A LATHE
[75] Inventors: Charles D. Sherwood, Elmira; James R. Cordier, Erin, both of N.Y.
[73] Assignee: Hardinge Brothers, Inc., Elmira, N.Y.
[22] Filed: July 12, 1971
[21] Appl. No.: 161,666

[52] U.S. Cl. .................................................. 82/12
[51] Int. Cl. ............................................. B23b 5/40
[58] Field of Search ........................... 82/24, 36, 12

[56] References Cited
UNITED STATES PATENTS
| | | | |
|---|---|---|---|
| 2,563,918 | 8/1951 | Casella et al. | 82/24 |
| 3,385,143 | 5/1968 | Walk | 82/24 |
| 3,270,598 | 9/1966 | Mailloux | 82/36 |
| 2,828,658 | 4/1958 | Algatt et al. | 82/12 |
| 3,590,672 | 7/1971 | Cordier | 82/12 |

*Primary Examiner*—Leonidas Vlachos
*Attorney*—Shlesinger, Arkwright & Garvey

[57] ABSTRACT

A lathe including a base member having a spindle positioned near one end thereof, a carriage member mounted for reciprocation longitudinally on the base member toward and away from the spindle, tool support means mounted on the carriage member, the lathe including lateral and vertical precision adjustment means for positioning a tool on the centerline of the spindle, the lateral position adjustment means including means for precision adjustment of the lateral position of the carriage member on the base member and the vertical position adjustment means including means associated with the tool support means for precision vertically adjusting a tool thereon.

15 Claims, 10 Drawing Figures

INVENTORS
CHARLES D. SHERWOOD
JAMES R. CORDIER

PATENTED OCT 2 1973 3,762,247

INVENTORS
CHARLES D. SHERWOOD
JAMES R. CORDIER

BY Shlesinger, Arkwright & Garvey
ATTORNEYS

INVENTORS
CHARLES D. SHERWOOD
JAMES R. CORDIER

TOOL ADJUSTMENT MECHANISMS FOR A LATHE

This invention relates to a lathe, and more particularly to a lathe having precision adjustments permitting exact placement of a tool on the centerline of the spindle in both horizontal and vertical planes.

One of the primary criteria for precision machining with a lathe is the positioning of the tool bit in the proper relationship with respect to the workpiece being machined. This is particularly so in the case of radius turning such as for example when turning contact lenses or spectacle lenses. In the case of radius turning, it is imperative that the point of the tool bit be placed exactly on the centerline of the spindle in order that the finished product meet the requisit specifications. If the tool bit is not exactly on the centerline of the spindle, the radius turned on the workpiece will not be accurate.

Usually when a lathe is manufactured, the machine is assembled in such a manner that the tool bit will be exactly on the centerline of the spindle. However, wear which develops through continued use of the machine will result in the tool bit being displaced from the centerline of the spindle. This has been a serious disadvantage in prior art lathes in that they have been unable to compensate for this wear by suitable adjustment.

Another disadvantage of prior art lathes has been the difficulty encountered in machining a compound radius on the workpiece. No suitable means has heretofore been devised to indicate to what extent a given radius has been turned before changing the radius to complete the compound curvature. The precision in this type of work has heretofore been largely a function of the skill of the machinist.

Therefore, a primary object of this invention is to overcome the disadvantages of prior art lathes.

Another object of this invention is to provide a lathe having suitable adjustment mechanisms for placing the tool on the centerline of the spindle.

A further object of this invention is to provide an adjustment mechanism for a lathe whereby the tool may be positioned both laterally and vertically with respect to the spindle.

A further object of this invention is to provide adjustment means positioned on the lathe so as to be easily accessable by the operator.

Still another object of this invention is to provide precision adjustment means for a lathe to compensate for wear.

Still a further object of this invention is to provide precision adjustments for a radius turning lathe.

Yet another object of this invention is to provide a radius turning lathe having an indicator for use when turning compound radii.

Yet a further object of this invention is to provide a lathe wherein the tool carriage may be adjusted laterally of the base slide.

A still further object of this invention is to provide a lathe wherein a vertical position of a tool holder may be adjusted easily and precisely.

These and other objects and advantages of this invention will become apparent when considered in light of the following description and claims when taken together with the drawings in which:

DESCRIPTION OF FIGS. 1–7

Figure 1:
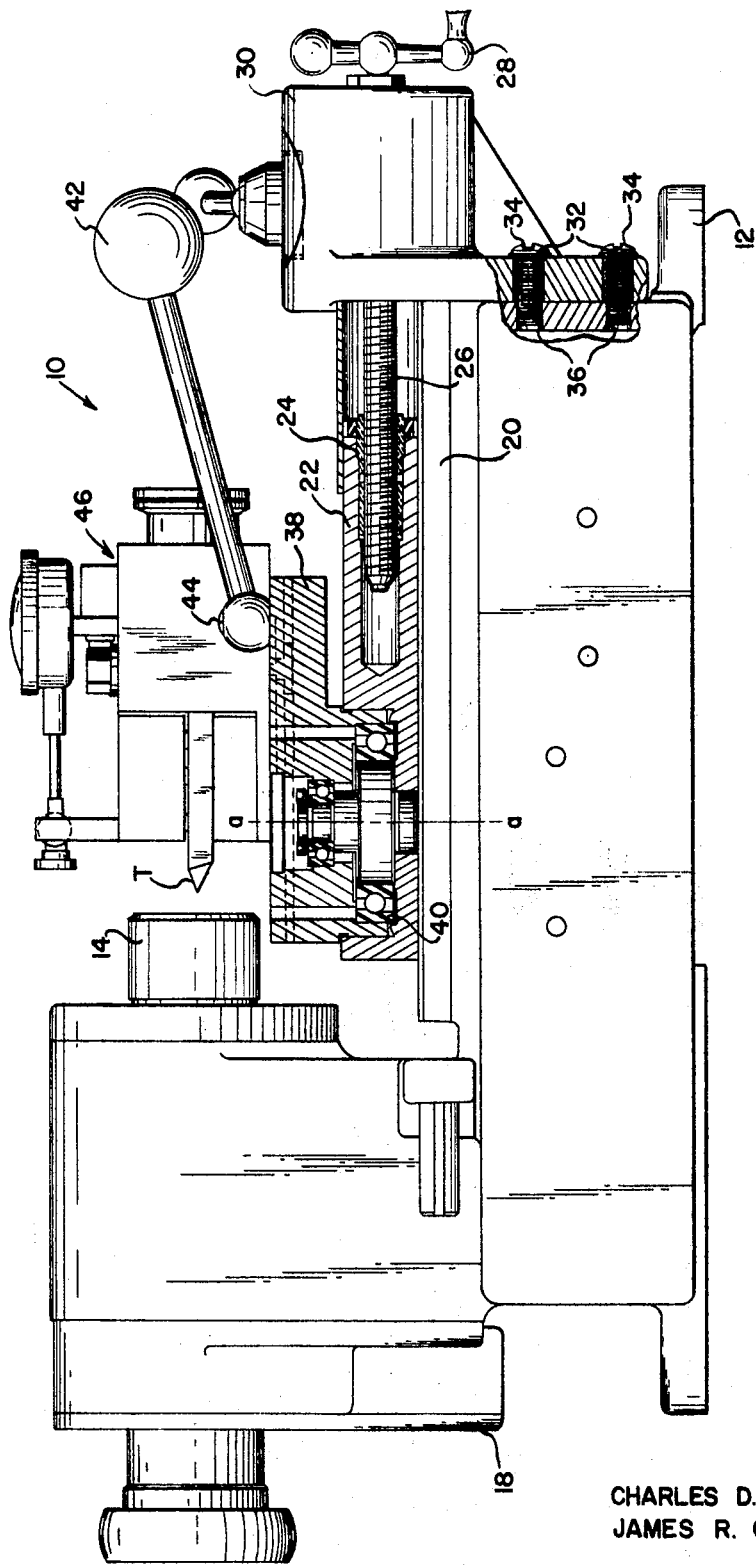
FIG. 1 is a side elevation view of the lathe of this invention with parts shown in cross-section.

With reference now to FIG. 1, the lathe of this invention generally designated 10 is seen to include a base 12 having a spindle 14 driven by a motor 16 through suitable belting (not shown) in housing 18. Base 12 includes a slide 20 which is preferably of a dovetail configuration as been seen in FIG. 3.

Mounted upon the slide 20 is a carriage or bottom slide 22 which is reciprocable on slide 20. Carriage 22 includes a feed screw nut 24 into which is threaded a feed screw 26, which is rotatable by means of handle 28. Feed screw 26 passes through a housing 30 which contains the carriage shifting mechanism disclosed in our copending application, Ser. No. 156,247, filed June 24, 1971, and entitled "Quick Acting Carriage Shifting Mechanism for a Lathe." Housing 30 includes elongated apertures 32, and suitable screws or bolts 34 pass through apertures 32 and are threaded into threaded bores 36 in base 12. The reason for the apertures 32 being elongated will become apparent as the description of the invention proceeds.

Carriage 22 serves to support a swivel post 38 mounted thereon by means of bearings 40. In this manner, swivel post 38 is free to rotate about axis a—a. A handle 42 is attached to the swivel post 38 by means of a screw 44. Handle 42 is utilized to rotate swivel post 38 about axis a—a.

Mounted on the top of swivel post 38 is a tool support member generally disignated 46 which will be more fully described hereinafter.

Figure 2:
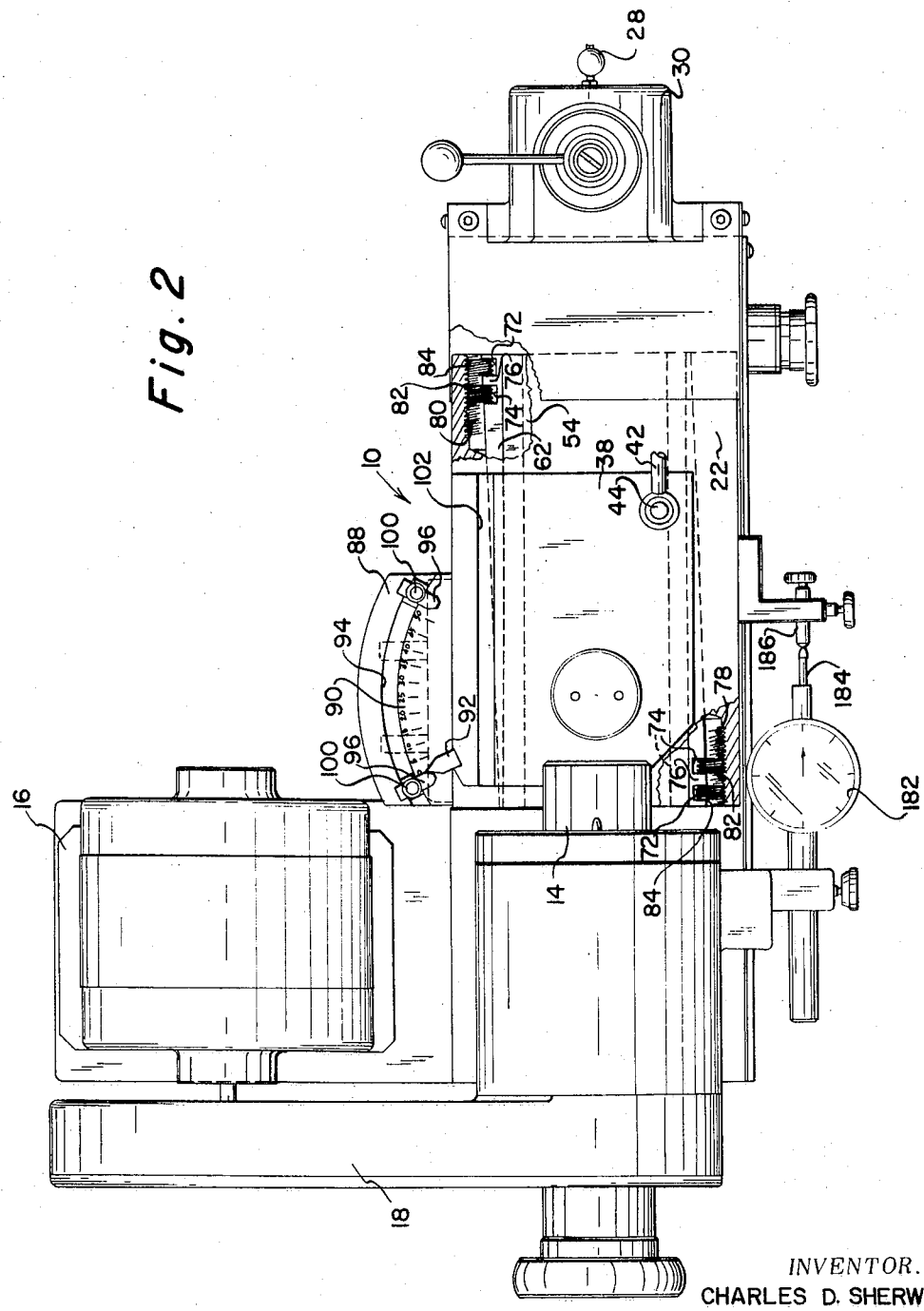
FIG. 2 is a top plan view of the lathe of this invention with the tool post removed and parts broken away for purposes of clarity.
Figure 3:
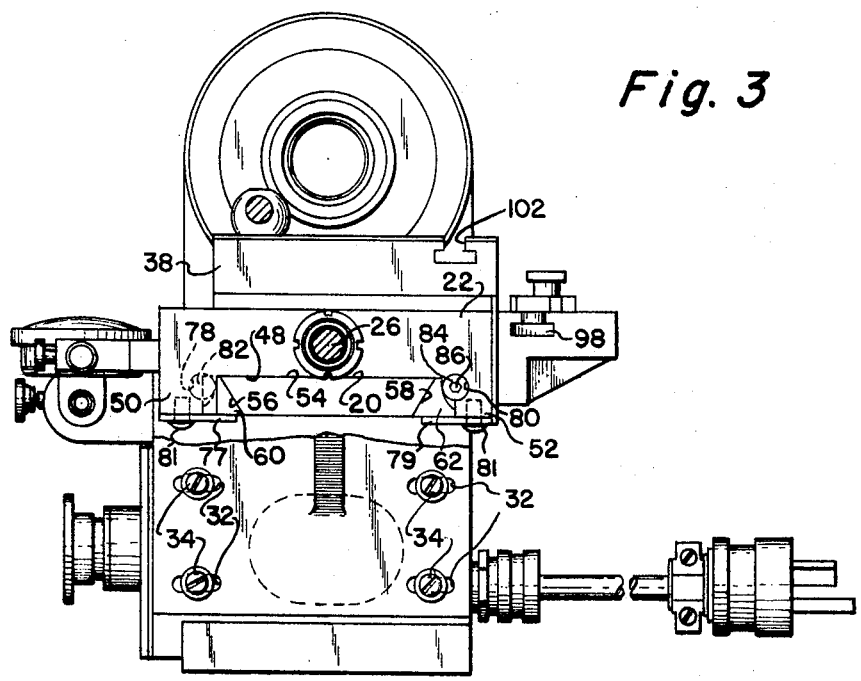
FIG. 3 is an end view of the lathe of this invention with portions removed and parts broken away for purposes of clarity.
Figure 4:
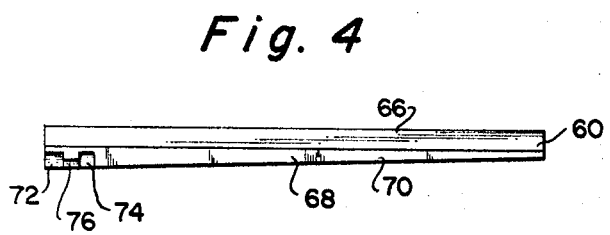
FIG. 4 is a top plan view of one of the adjustment members utilized in this invention.
Figure 5:
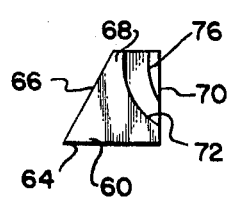
FIG. 5 is a left end view of the part shown in FIG. 4.
Figure 7:
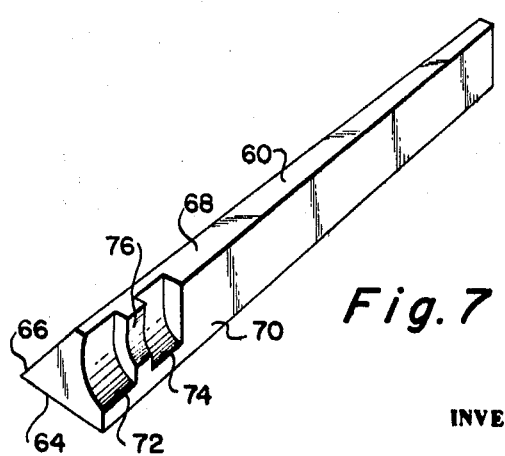
FIG. 7 is a perspective view of the part shown in FIG. 4.
Figure 6:
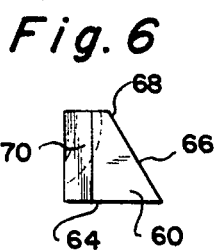
FIG. 6 is a right end view of the part shown in FIG. 4.

With reference now to FIGS. 2 and 3, the mechanism by which the lateral position of the tool may be adjusted will be described. A tool bit T is carried by the tool support member 46 which in turn is rigidly secured to the swivel post 38. In turn, the swivel post 38 is secured to the carriage 22 so that only rotary motion is permitted, while translatory motion of the swivel post 38 with respect to the carriage 22 is prevented. Thusly, the lateral position of the tool T may be adjusted by shifting the lateral position of the carriage 22 with respect to the slide 20. The carriage 22 is seen to have an inverted, substantially U-shaped configuration and includes a supporting surface 48 and sidewall portions 50 and 52. Side wall portions 50 and 52 are preferably arranged at substantially a right angle to the supporting surface 48. The slide 20 includes a supporting surface 54 and side walls 56 and 58 arranged preferably at an acute angle to surface 54, thus forming a dovetail slide. Side walls 50 and 52 of the carriage 22 and side walls 56 and 58 of the slide 20 are spaced from each other as best seen in FIG. 3. In the space between side wall 50 and surface 56 and between side wall 52 and surface 58 are positioned a pair of gibs 60 and 62. Gib 60 is more clearly illustrated in FIGS. 4 through 7. However, both gibs 60 and 62 are identical to each other, and in position on the lathe, they are inverted end for end with respect to each other. With respect to FIGS. 4 through 7, gib 60 is seen to have a bottom surface 64, and one side surface 66 disposed at an acute angle with respect to bottom surface 64. A top surface 68 is substantially parallel to bottom surface 64. The other side surface 70 of gib 60 is tapered, preferably at an angle of approximately 1° 30' however any suitable angle may be utilized depending upon the degree of lateral motion to be imparted to the carriage 22 by means of the adjustment mechanism. The angle between side surface 66 and bottom surface 64 of gib 60 is preferably about 60° however, other suitable angles may be used provided the surface 66 will be parallel to the corresponding surface 56 of slide 20. At the wider end of gib 60 are provided a pair of notches 72 and 74, separated by a wall portion 76.

The gibs 60 and 62 are inserted into the spaces between wall 50 and surface 56 and between wall 52 and surface 58. Walls 50 and 52 are tapered so as to correspond to the taper on gibs 60 and 62. Cover plates 77 and 79 are secured to carriage 22 by means of screws 81 and serve to keep foreign matter out of the adjustment mechanism as well as holding the gibs 60 and 62 in their proper position.

Carriage 22 is provided with a pair of longitudinally extending threaded bores 78 and 80 into which a pair of nuts 82 and 84 having hexagon bores 86 are threaded.

To shift the lateral position of the carriage 22 on the slide 20, a suitable Allen wrench (not shown) is inserted into hexagon bores 86, the wrench being inserted into both bores 86 of a pair of nuts 82 and 84. By rotating the nuts 82 and 84 with the wrench, the nuts 82 and 84 travel longitudinally in their respective bores 78 and 80, and shift the longitudinal position of the gibs 60 and 62. Since gibs 60 and 62 are tapered, their surfaces 70 cooperate with side walls 50 and 52 of the carriage 22 and shift the carriage 22 laterally, depending upon which direction the gibs are moved. With a tapered angle of 1° 30' on the gibs 60 and 62, a very fine precise lateral positioning adjustment for the tool bit is had. After the exact lateral position of the tool bit is established, the wrench is withdrawn from the innermost of the nuts 82 and the outermost nut 84 is tightened against the gib 60 or 62 to securely lock the position of the tool.

The housing 30, as previously mentioned, is secured to the base 12 by means of screws 34, and includes elongated apertures 32 through which the screws 34 pass. In order to accomplish the lateral adjustment of the carriage 22 on the slide 20, it is thus necessary to loosen the screws 34 to permit the housing 30 to shift with respect to the base 12 by means of the elongate slots 32. After the position of the carriage 22 is determined and set, screws 34 are tightened to further lock the adjustment.

Secured to the carriage 22 is a scale 88 provided with indicia 90 calibrated in degrees of rotation. A pointer 92 is rigidly secured to the swivel post 38 for rotation therewith about axis a—a, and the longitudinal axis of the pointer passes through the tip of the pointer 92 and through the axis $a-a$. In this manner, the degree of rotation of the tool bit T across the face of the workpiece may be seen when cutting compound surfaces on the workpiece.

A T-slot 94 is provided in the scale 88 and a pair of stops 96 having T-bolts 98 are positioned within the T-slot 94. Thumb screws 100 are aecured to T-bolts 98, and by loosening the thumb scres 100, the position of the stops 96 may be adjusted in the T-slot 94. In this manner, the angular rotation of the swivel plate 38 on the carriage 22 may be controlled to the exact degree required.

Figure 8:
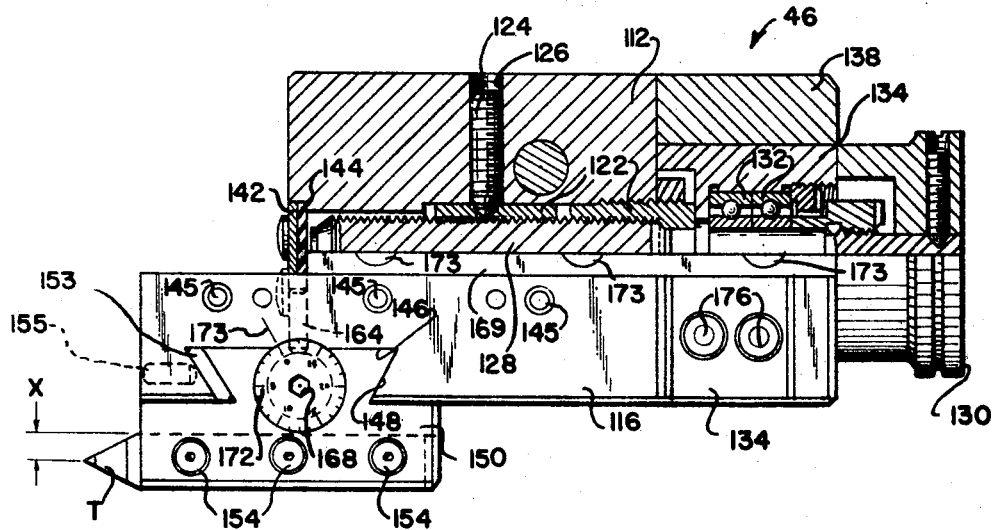
FIG. 8 is a top view of the tool post of this invention in partial cross-section.
Figure 9:
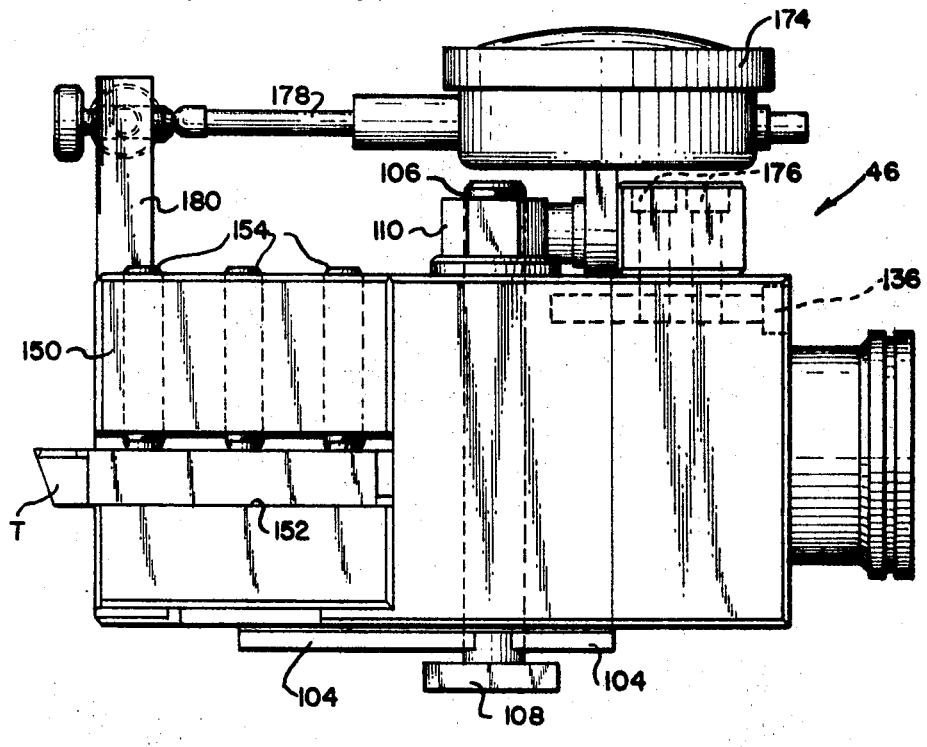
FIG. 9 is a side elevation of the tool post utilized in this invention.
Figure 10:
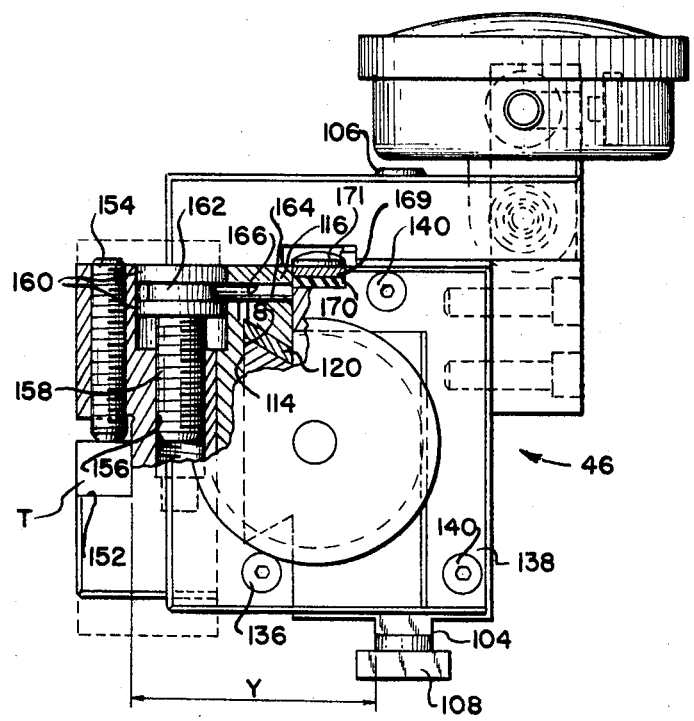
FIG. 10 is an end view of the tool post utilized in this invention in partial cross-section.

As seen in FIGS. 2 and 3, the swivel post 38 is provided with a T-slot 102. T-slot 102 serves as a mounting slot for the tool support member 46. With reference now to FIGS. 8 through 10, the tool support member 46 is seen to be provided with guide members 104 and a bolt 106 having a square or rectangular head 108. Bolt 106 is provided with a nut 110. When the tool support member 46 is placed in the T-slot 102, guide member 104 fits in the upper portion of the slot 102, and prevents any angular shifting between the tool support member 46 and the swivel post 38. Head 108 of bolt 106 fits in the enlarged portion of T-slot 102, and the tool support member 46 may be adjusted longitudinally in the slot 102 to roughly the required position. After this rough position is reached, nut 110 may be tightened, and tool support member 46 is securely locked in place on the swivel post 38.

To provide for a very fine adjustment of the turning radius of the tool the tool support member is provided with a body portion 112 having a male dovetail projection 114 forming a slide. A tool holder carrying member 116 is provided with a female dovetail recess 118 which is slightly wider than the male dovetail projection 114 to permit a gib 120 to be inserted therein for adjustment purposes. A feed screw nut 122 is secured to body 112 by means of a set screw 124 in threaded bore 126. A feed screw 128 threadedly engages feed screw nut 122, and rotation of feed screw 128 by means of knob 130 results in longitudinal reciprocation of member 116 through bearings 132 and cap 134 which is secured to member 116 by means of bolts 136. An end plate 138 secured to housing 112 by means of bolts 140 serves to guide member 134. A wiper 142 and a gasket 144 serves to keep foreign matter out of the slide mechanism, while gib 120 is tightened by means of screws 145 to take up any slack.

To provide for vertical adjustment of the tool T, the member 116 is provided with a female dovetail recess 146 which receives the male dovetail projection 148 of a tool holder 150. Tool holder 150 includes a recess 152 for receiving the tool T. The tool T is locked into place by means of the three set screws 154. The female dovetail recess 146 is slightly wider than the projection 148 to permit insertion of a gib 153 against which set screw 155 bear to lock the tool holder 150 in position in member 116.

The tool holder 150, carrying with it the tool T is vertically adjustable in the female dovetail recess 146. As best seen in FIG. 10, the tool holder 150 is provided with a threaded bore 156 into which is threaded screw 158. Screw 158 is provided at its upper end with a pair of annular flanges 160 separated by an area 162 of reduced diameter. A dowel pin 164 is pressed into a recess 166 in member 116, and the distal end of dowel 164 projects outwardly from member 116 into the space 162 on screw 158. The upper surface of screw 158 is provided with a recess 168 which is preferably hexagonal in cross-section for receiving an Allen wrench for adjustment purposes. In this manner, rotation of screw 158 by means of a suitable wrench (not shown) will result in the tool holder 150 being shifted vertically between the two dotted line positions shown in FIG. 10 as the flanges 160 coact with dowel pin 164. The precision with which the vertical adjustment is made is a function of the pitch of the threads on screw 158 and the corresponding threads on bore 156. Thus the lower the pitch, the more precise the adjustment. A wiper 169 and a gasket 170 are secured to block 112 by means of screws 171 and serve to keep foreign matter out of the adjustment mechanism.

Preferably the top of screw 158 is provided with a vernier scale 172 having suitable indicia, and the top surface of member 116 is provided with a zero line 173. In this manner, a precise adjustment of the vertical position of tool T may be attained and may also be repeated if for some reason it is necessary to remove the tool holder 150.

If desired, a dial indicator 174 may be secured to cap 134 by means of screws 176. Additionally, the actuating arm 178 of the dial indicator 174 is positioned so as to contact a stop 180 attached to the body 112. In this manner, the turning radius of the tool may be precisely determined.

In a like manner, as seen in FIG. 2, a dial indicator 182 may be secured to the base 12 of the lathe 10 and have its actuating arm 184 contacting a stop 186 secured to carriage 22. In this manner, dial indicator 182 indicates the relationship of the carriage 22 with respect to the workpiece.

In order to maintain repeatability in the machining operation utilizing various tools, the distance "X" in FIG. 8 is held constant for all tool bits used. Likewise, the distance "Y" seen in FIG. 10 from the tool locating slot to the mounting key 104 is held to a fixed dimension.

Throughout this application, the term "precision" refers to a micro adjustment, as opposed to the macro adjustments commonly found on some prior art lathes. With the adjustments provided by this invention, changes in the location of the tool may be made on the order of from ten-thousandths to millionths of an inch whereas on prior art devices, changes of 0.001 inch were difficult to attain.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A radius turning lathe comprising:
   a. a base member having a dovetail slide and a spindle having a longitudinal axis parallel to said slide,
   b. a carriage member mounted for longitudinal reciprocation on said slide and having a slide surface engaging said slide and side surfaces spaced from the dovetail of said slide,
   c. said surfaces forming a U-shaped channel for receiving said slide,
   d. adjustment members positioned between each of said side surfaces and said dovetail slide,
   e. said adjustment members comprising tapered gibs having straight surfaces conforming to said side surfaces and angled surfaces conforming to the dovetail angle of said slide,
   f. said gibs being reversed end for end with respect to each other,
   g. screw means for moving said gibs longitudinally thereby moving said carriage member laterally on said base member,
   h. plate means attached to said carriage for securing said gibs against vertical displacement,
   i. a tool member,
   j. means mounted on said carriage for mounting said tool member for pivotal movement about a vertical axis,
   k. positive vertical adjustment means for vertically positioning said tool member,
   l. means for positively shifting the relative longitudinal position of said tool member and said vertical axis,
   m. said adjustment members and said positive vertical adjustment means serving to precisely position and hold the cutting tip of said tool member on said longitudinal axis.

2. A lathe as in claim 1 and wherein:
   a. said gibs are identical.

3. A lathe as in claim 1 and wherein:
   a. said screw means includes a pair of threaded bores extending longitudinally into a pair of diagonally opposite corners of said carriage member,
   b. a screw member in each of said threaded bores,
   c. each of said screw members having a portion engageable with said gibs,
   d. whereby rotation of said screw members moves said gibs longitudinally of said base member.

4. A lathe as in claim 3 and wherein:
   a. each of said screw members includes a pair of screws,
   b. said gibs including a pair of notches,
   c. each of said screws having a portion in engagement with said notches.

5. A lathe as in claim 4 and wherein:
   a. each of said screws includes a polygonal passageway extending therethrough,
   b. said passageways of each of said pairs of screws being in axial alignment for simultaneous engagement with a wrench.

6. A lathe as in claim 1 and wherein:
   a. said tool support means includes a tool member post member having a longitudinally adjustable portion, and
   b. said longitudinally adjustable portion having a vertical slide for adjustably receiving a tool holder.

7. A lathe as in claim 6 and including:
   a. a tool holder for said tool member mounted in said vertical slide,
   b. said precision vertical adjusting means including means for positively vertically moving said tool holder in said vertical slide.

8. A lathe as in claim 7 and wherein:

a. said means for positively vertically moving said tool holder includes screw means.

9. A lathe as in claim 8 and wherein:

a. said screw means includes a threaded bore in said tool holder substantially parallel to said vertical slide, b. a screw member in said threaded bore, c. said screw member having a threaded shank portion and a pair of spaced apart annular flanges, d. a projection member secured to said longitudinally adjustable portion and extending from said longitudinally adjustable portion into the space between said annular flanges, e. whereby upon rotation of said screw member, the vertical position of said tool holder may be precision adjusted.

10. A lathe as in claim 9 and wherein:

a. said screw member includes vernier indicia.

11. A lathe as in claim 7 and wherein:

a. said carriage member includes a bottom slide member mounted for longitudinal reciprocation on said base member toward and away from said spindle, b. a swivel post mounted on said bottom slide member and being rotatable about a vertical axis, c. said tool post member being rotatable therewith.

12. A lathe as in claim 11 and wherein:

a. said swivel post includes a pointer thereon, b. said bottom slide includes an indicia plate member thereon for cooperation with said pointer for indicating the radial position of said swivel plate.

13. A lathe as in claim 12 and wherein:

a. said indicia plate member includes a stop member engageable by said pointer for limiting radial movement of said swivel post.

14. A lathe as in claim 13 and wherein:

a. said indicia plate includes a pair of said stop members.

15. A lathe as in claim 14 and wherein:

a. said stop members are adjustable.

* * * * *